UNITED STATES PATENT OFFICE.

KRISTIAN BENDIXEN, OF COPENHAGEN, DENMARK, ASSIGNOR TO FIRM SKIND-FABRIKEN UNICUM, KR. BENDIXEN, P. BENDIXEN & CO., OF COPENHAGEN, DENMARK.

PROCESS FOR TANNING OF FISH-SKINS OR THE LIKE.

1,230,266.      Specification of Letters Patent.      Patented June 19, 1917.

No Drawing.      Application filed February 19, 1912. Serial No. 678,473.

*To all whom it may concern:*

Be it known that I, KRISTIAN BENDIXEN, a subject of the King of Denmark, residing at Puggaardsgade 10, Copenhagen, Denmark, have invented certain new and useful Improvements in Processes for Tanning of Fish-Skins and the like, of which the following is a specification.

This invention relates to a process for tanning fish skins and the like, which process is particularly suitable for use with the skins of sharks, porpoises, whales, etc., as it renders it possible to utilize and work up the skins of such fish and animals in any desired manner.

The process is as follows:

The salted skins or hides are soaked in water until they are rendered quite fresh again and in the case of the skins of the shark these are stretched upon frames and dried. After this the spikes or scales are removed with a clean blunt scraper or tanner's knife. The skins are next put into lukewarm water until they are rendered perfectly soft and are then worked over a beam. They are next plunged into a suitable depilatory and antiseptic solution consisting say of 200 liters of water containing either a kilogram of sodium sulfid or a kilogram of white or raw red arsenic, or half a kilogram of each of these. In this depilatory and antiseptic solution, the skins are to remain for about three days, the skins however being turned twice daily.

After the expiration of the three days, the skins or hides are put into a solution of 200 liters of water and a suitable quantity of slaked lime to open the fibers of the skins and in this solution they are also left for about three days, being again turned twice daily.

The skins are next put into a lime-neutralizing solution of 50 liters of water and $\frac{1}{2}$ liter of hydrochloric acid and are agitated for about 5 minutes in this solution to dissolve and remove as much as possible of such lime as would otherwise remain in the pores and interfere with the pliability of the ultimate product, and are then bated in a bating mill containing 100 liters of water, $\frac{1}{3}$ bucket of poultry dung and $\frac{1}{2}$ kilogram of any preferred chemical bating compound heated to a temperature of about 18° C.

After bating, the skins are first washed in clean lukewarm water and then in a solution of $\frac{1}{2}$ liter of hydrochloric acid and 200 liters of water.

The skins are then put into a vat containing a mild dilute solution (about 5° or 6° barkometer) of a conventional tanning material, to which liquid a suitable tanning material is added every third day until the skins are thoroughly tanned.

As an alternative, after treatment in the hydrochloric solution, the skins may be placed in a mill with about 4 kilograms of salt and 40 liters of water, and milled for about 10 minutes and then treated with three solutions gradually of chrome tanning material. After this the skins are again milled for about 8 hours and are then left for the night in the mill, milled again on the following day for about 2 hours and then completely tanned.

The skins are next put into a mill with pure lukewarm water until they are entirely freed from acid, and are then milled for about 6 hours in a mild relatively dilute solution (about 5° or 6° barkometer) of sumach extract and water. After this they are colored and then smeared with oil and spread out, dried, damped and smoothed out, polished and bleached. Finally they are rubbed with one part of albumen and 10 parts of water or of skimmed milk to render the skins supple and to prepare them for coloring. They are then glazed and grained.

If the grain does not come out clearly the skins are placed for about 5 minutes in a solution of one liter of sulfuric acid and 100 liters of water.

As tanning agents the following are given as examples:—

Oak wood or oak bark, or extract of oak bark or various other extracts such as quebracho and extracts of gambier.

What I claim and desire to secure by Letters Patent of the United States of America is:—

1. A process for tanning and permanently rendering soft and pliable fish skins and the like consisting in softening the skins, treating them for about three days in a depilatory solution, then treating them for a further period of about three days in a solution of water and slaked lime, turning the hides during such treatments, agitating the hides for a brief period in a solution of water and hydrochloric acid and then bating them in a mill containing water, poultry dung and any preferred chemical bating compound substantially as described.

2. A process for tanning and permanently rendering soft and pliable fish skins and the like consisting in softening the skins, treating them for about three days in a solution of water and sodium sulfid, then treating them for a further period of about three days in a solution of water and slaked lime, turning the hides twice daily during such treatments, agitating the hides for about five minutes in a solution of water and hydrochloric acid and then bating them in a mill containing water, poultry dung and a chemical bating compound substantially as described.

3. A process for tanning and permanently rendering soft and pliable fish skins and the like consisting in softening the skins, treating them for about three days in a depilatory solution, then treating them for a further period of about three days in a solution of water and slaked lime, turning the hides daily during such treatments, agitating the hides for a brief period in a solution of water and hydrochloric acid, bating them in a mill containing water, poultry dung and a chemical bating compound, then removing them into pure lukewarm water, then into a solution of hydrochloric acid and water and then placing them in a tanning vat to which tanning material is added every third day until the skins are completely tanned substantially as described.

4. A process for tanning and permanently rendering soft and pliable fish skins and the like, consisting in softening the skins, treating them for about three days in a solution of water and sodium sulfid, then treating them for a further period of about three days in a solution of water and slaked lime, turning the hides at least twice daily during such treatments, agitating the hides for about five minutes in a solution of water and hydro-chloric acid, then bating them in a mill containing water, poultry dung and a chemical bating compound, then removing them into pure lukewarm water, then into a solution of hydro-chloric acid and water and then placing them in a tanning vat to which tanning material is added every third day until the skins are completely tanned substantially as described.

5. A process for tanning and permanently rendering soft and pliable fish skins and the like consisting in softening the skins, treating them for about three days in a depilatory solution, then treating them for a further period of about three days in a solution of water and slaked lime, turning the hides at least during such treatments, agitating the hides for a brief period in a solution of water and hydrochloric acid, then bating them in a mill containing water, poultry dung and a chemical bating compound, then washing them in pure lukewarm water and afterward with a solution of hydrochloric acid and water and then milling them in a mill containing a suitable solution of salt to which a suitable chrome tanning material is added, the milling being then continued until the skins are fully tanned substantially as described.

6. A process for tanning and permanently rendering soft and pliable fish skins and the like, consisting in softening the skins treating them for about three days in a solution of water and sodium sulfid, then treating them for a further period of about three days in a solution of water and slaked lime, turning the hides at least twice daily during such treatment, agitating the hides for about five minutes in a solution of water and hydrochloric acid, then bating them in a mill containing water, poultry dung and a chemical bating compound, then washing them in pure lukewarm water and afterward with a solution of hydrochloric acid and water and then milling them in a mill containing a suitable solution of salt to which a suitable chrome tanning material is added, the milling being then continued until the skins are fully tanned substantially as described.

7. A process for tanning and permanently rendering soft and pliable fish skins and the like consisting in softening the skins, treating them for about three days in a depilatory solution, then treating them for a further period of about three days in a solution of water and slaked lime, turning the hides during such treatment, agitating the hides for a brief period in an acid solution, then bating them for a short time with a mild bating solution, then washing them in pure lukewarm water and afterward with an acid solution, then milling them in a mill containing a suitable solution at a strength of about 6° barkometer of tanning material.

8. A process for tanning and permanently rendering soft and pliable fish skins and the like, consisting in softening the skins, treating them for about three days in a solution of water and sodium sulfid, then treating them for a further period of about three days in a solution of water and slaked lime, turning the hides at least twice daily during such treatments agitating the hides for about five minutes in a solution of water and hydrochloric acid, then bating them in a mill containing water, poultry dung and a chemical bating compound then washing them in pure lukewarm water and afterward with a solution of hydrochloric acid and water, then milling them in a mill containing a suitable solution of salt to which a suitable chrome tanning material is added, the milling being then continued until the skins are fully tanned, freeing the hides from acid and treating them for about six hours in a solution of extract of sumach and water substantially as described.

9. A process of tanning and thereby rendering soft and pliable whale, fish-skins, and the like, consisting in subjecting the skins to depilatory and plumping steps; and thereafter subjecting them to the action of a weak solution, say about 6° barkometer, of tanning material until the skins are completely tanned.

10. A process of tanning and thereby rendering soft and pliable whale, fish-skins, and the like, consisting in subjecting the skins to preparatory steps; and then proceeding with the actual tanning by subjecting them for a prolonged period to the action of a materially weak solution of tanning material, meanwhile maintaining said solution at a strength of about 6° barkometer until the tanning is complete.

11. A process of tanning and thereby rendering soft and pliable whale, fish-skins and the like, consisting in mildly bating the skins at a temperature of about 20° C. in a very mild solution of a mild bating agent; and thereafter subjecting them to the prolonged action of a very mild tanning solution until completely tanned.

12. A process for rendering whale, fish-skins and the like permanently soft, tough and pliable by a tanning operation, which consists in mildly bating at a low temperature, and thereafter subjecting the skins to the continued influence of a weak tanning solution.

In testimony whereof, I affix my signature, in presence of a witness.

KRISTIAN BENDIXEN.

Witness:
P. BENDIXEN.